US006668518B2

United States Patent
Rea

(10) Patent No.: US 6,668,518 B2
(45) Date of Patent: Dec. 30, 2003

(54) MACHINE FOR MAKING FILTER BAGS FOR PRODUCTS FOR INFUSION

(75) Inventor: Dario Rea, Monterenzio (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 32 days.

(21) Appl. No.: 09/725,488

(22) Filed: Nov. 30, 2000

(65) Prior Publication Data

US 2001/0037623 A1 Nov. 8, 2001

(30) Foreign Application Priority Data

Dec. 3, 1999 (IT) ......................................... BO99A0663

(51) Int. Cl.[7] ............................................. B65B 61/14
(52) U.S. Cl. ..................... 53/134.2; 53/134.1; 493/226; 493/375; 493/376
(58) Field of Search ............................ 53/134.1, 134.2; 493/226, 375, 376; 83/152, 153, 349, 436.9, 734

(56) References Cited

U.S. PATENT DOCUMENTS

| 4,856,257 A | * | 8/1989 | Romagnoli ................. 493/375 |
| 5,527,419 A | * | 6/1996 | Vernon et al. ............. 53/134.2 |
| 5,632,132 A | * | 5/1997 | Kuipers et al. ............ 53/134.2 |
| 5,689,936 A | * | 11/1997 | Kenney .................... 53/134.2 |
| 5,871,789 A | * | 2/1999 | Romagnoli ................ 53/134.2 |
| 6,328,832 B1 | * | 12/2001 | Otruba et al. .................. 156/64 |

FOREIGN PATENT DOCUMENTS

| EP | 0489554 A1 | 6/1992 |
| EP | 0778204 A1 | 6/1997 |
| IT | 1207629 | 8/1989 |
| WO | WO 94/22721 | 10/1994 |
| WO | WO 99/21762 | 5/1999 |

* cited by examiner

Primary Examiner—Rinaldi I. Rada
Assistant Examiner—Thanh Truong
(74) Attorney, Agent, or Firm—Arent Fox Kintner Plotkin & Kahn, PLLC

(57) ABSTRACT

A machine which makes filter bags from flat tubular envelopes for products to be infused includes a thread applying station having a first drum rotating in a defined direction and a plurality of seats to position and pick up of seals, continuous thread and pick-up tabs fed from feed units located downstream of one another relative to the rotation direction of the first drum. The seal and pick-up tab feed units are supplied with continuous webs fed towards relative cutting elements, which cut the webs into individual seals and individual pick-up tabs. Two feed units each include a corresponding transfer element operating between a corresponding cutting element and the first drum and pick up individual seals and pick-up tabs in a first zone at the cutting elements and transfer them to a second zone separated from the first zone by a given angle and at a seat on the drum.

4 Claims, 3 Drawing Sheets

MACHINE FOR MAKING FILTER BAGS FOR PRODUCTS FOR INFUSION

BACKGROUND OF THE INVENTION

The present invention relates to a machine for making filter bags for products for infusion, such as tea, coffee, chamomile, etc.

In the present description, the filter bags made are of the so-called two-lobe type, with the thread and pick-up tab connected by part of a heat-sealable adhesive seal, located over one end of the filter bag, whilst another part of the seal is used to join one end of the thread to a heat-sealed edge of one lobe of the filter bag (opposite that on which the pick-up tab is joined). The thread, whose length is substantially equal to the total length of the two extended lobes, is wrapped around the filter bag.

Automatic packaging machines which make the above-mentioned filter bags normally comprise: a first station which feeds a continuous web of filter paper under a station which delivers successive doses of the product for infusion at given intervals; a sealing station which uses longitudinal and transversal heat-sealing to form a continuous flat tubular envelope, with a continuous succession of lobes containing doses of the product.

This continuous tube is fed as far as an operating station at which a continuous thread with pick-up tabs attached at regular intervals and the relative seals, is fixed to the continuous tube by heat-sealing the seals to the tube.

Following application of the thread with the pick-up tab and seal, successive operating stations cut the continuous tube transversally into portions, each with a pair of lobes, fold each pair of lobes towards one another and join them in such a way as to form a two-lobe filter bag.

The station which applies the seal and pick-up tab to the thread (of particular interest in this description), comprises a rotary drum with continuous motion, located below the surface on which the continuous tube of lobes passes and having a plurality of seats evenly distributed over its surface. These comprise vacuum means which pick up the thread, tabs and seals and a heating base, designed to join the seals to the thread and the tabs.

As described and illustrated, for example, in Italian Patent No. 1.207.629, close to the drum, one upstream of the other relative to the direction of rotation of the drum, there is a unit which feeds one seal at a time to a relative seat and a unit which feeds one pick-up tab at a time to the same seat. Between the two units there is a unit which feeds the continuous thread over the drum. The distance between two successive vacuum seats is equal to the total length of two lobes of a filter bag. The synchronized feed of the three elements (thread, pick-up tab and seal joined together) allows them to be brought to the continuous tubular envelope at a zone in which there is a counter-roller which is heated and designed to allow fixing of the seal—pick-up tab and thread to the continuous tube.

The unit which feeds the seal to the rotary drum comprises means for feeding a continuous web, which is fed intermittently to a cutting roller fitted with a knife which operates in conjunction with a fixed blade to form individual seals, by means of two successive cuts in the continuous web which form a front end and a rear end of the seal. The cutting roller is positioned at a tangent to the rotary drum so that, during formation of the rear end of the seal by the knife and the fixed blade, the front end of the seal is picked up by the drum seat by means of the vacuum.

Similarly, the unit which feeds the pick-up tabs comprises means which feed a continuous web, which is fed with intermittent motion to a cutting roller having a knife which, operating in conjunction with a fixed blade, cuts the continuous web into sections, each forming a single pick-up tab, by means of two successive cuts in the continuous web which form a front end and a rear end of the pick-up tab. Similarly, the cutting roller is positioned at a tangent to the rotary drum so that, during formation of the rear end of the pick-up tab by the knife and fixed blade, the front end of the pick-up tab is picked up by the drum seat by means of the vacuum.

In recent years, the continuous studies which aimed to make packaging machines more productive have brought a significant increase in the operating speed of the individual parts of the various operating stations.

In particular, the increase in the speed of rotation of the drum has resulted in significant disadvantages.

In fact, it has been observed that, due to the increased speed of rotation of the drum, the transfer of the seals and pick-up tabs from the cutting rollers to the vacuum seats on the drum does not occur correctly. As a result, the pick-up tab and seal are often incorrectly positioned on the tubular envelope and, therefore, on the filter bags.

In other words, the seal and/or pick-up tab are often picked up in an uncontrolled fashion by the rotary drum which turns at high speed, being subjected to "jerking" during the transit of the seal and/or pick-up tab from the cutting roller to the drum vacuum seat, such that it results in incorrect positioning on the vacuum seat.

SUMMARY OF THE INVENTION

The aim of the present invention is, therefore, to overcome the above-mentioned disadvantages.

Accordingly, the present invention provides a packaging machine for making filter bags for products for infusion. These filter bags are made from a flat tubular filter paper envelope containing a succession of doses of the product for infusion. Each filter bag has a connecting thread and a pick-up tab, joined to one another and to the filter bag by a seal made of a heat-sealable material. The packaging machine comprises at least a station which uses heat-sealing to apply the continuous thread on the lower surface of the flat tubular envelope, the continuous thread bearing the seal and pick-up tab. This application station comprises a first drum, rotating in a given direction, positioned at a tangent to the tubular envelope, the outer surface of the drum having a plurality of seats which retain the seals, thread and pick-up tabs which are fed from relative feed units, each unit being positioned downstream of the next relative to the direction of rotation. The feed units for the seals and pick-up tabs comprise respective units which feed corresponding webs to elements that cut the webs so as to form individual seals and individual pick-up tabs. The machine is characterized in that the seal and pick-up tab feed units also comprise transfer means, operating between the cutting elements and the drum, which pick up the individual seals and individual pick-up tabs at a first zone at the cutting elements and transfer them to a second zone, separated from the first zone by a given angle, opposite a seat on the drum.

BRIEF DESCRIPTION OF THE DRAWINGS

The technical features of the present invention, in accordance with the above-mentioned aims, are set out in the claims herein and the advantages more clearly illustrated in the detailed description which follows, with reference to the accompanying drawings, which illustrate a preferred embodiment without limiting the scope of application, and in which:

DESCRIPTION OF THE PREFERRED EMBODIMENTS

Figure 1:
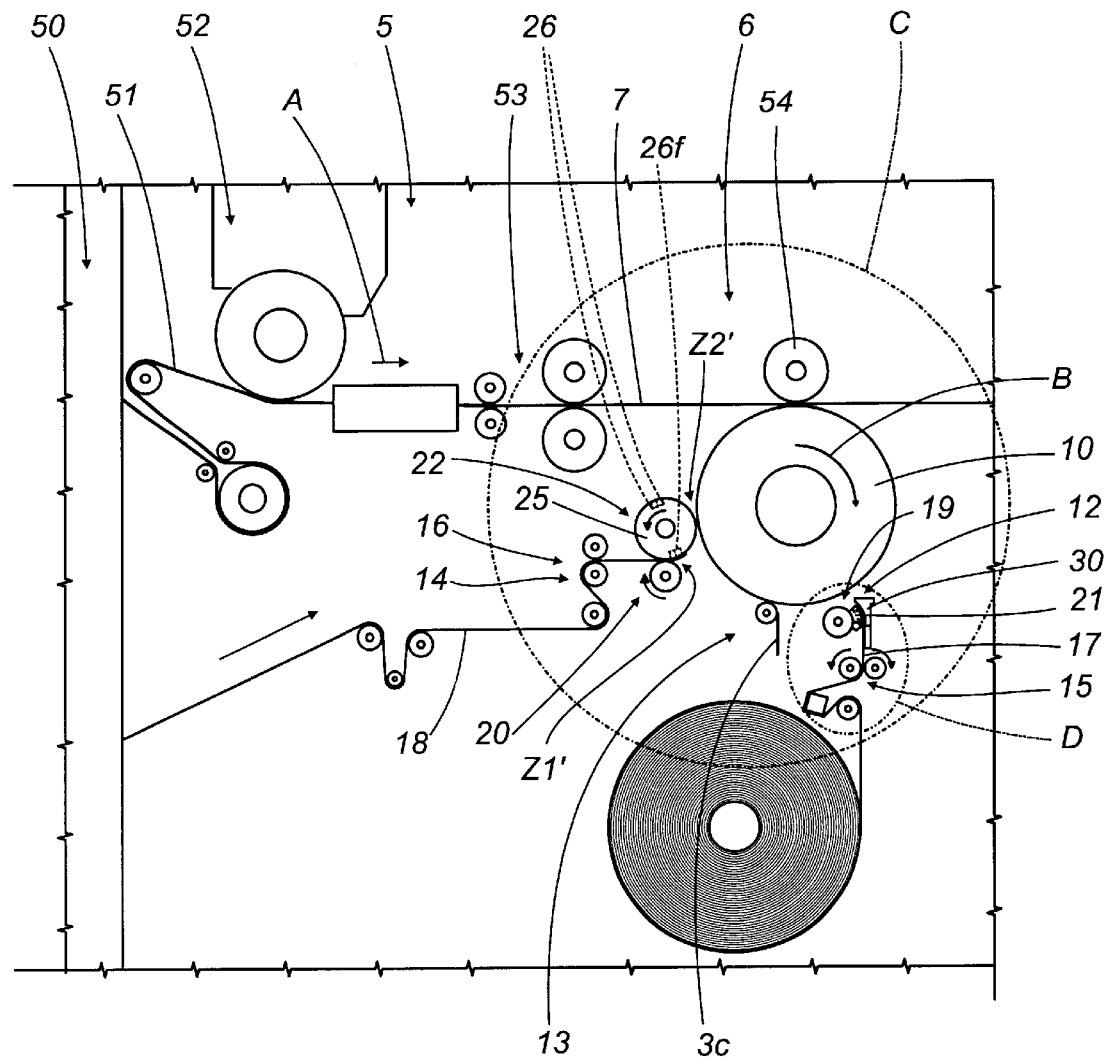
FIG. 1 is a schematic front view with some parts cut away to better illustrate others, of part of a packaging machine for making filter bags, in accordance with the present invention.
Figure 2:
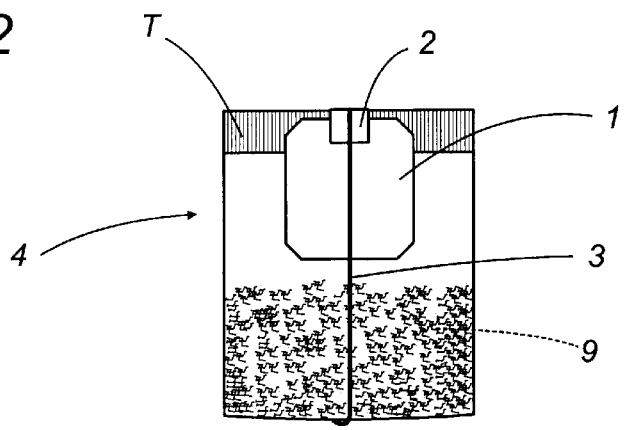
FIG. 2 is a front view of a filter bag made using the machine illustrated in FIG. 1.

With reference to the accompanying drawings and in particular FIG. 1, the packaging machine disclosed, labeled 5 as a whole, is used for making filter bags 4 for products for infusion, such as tea, coffee, chamomile, etc.

Figure 3:
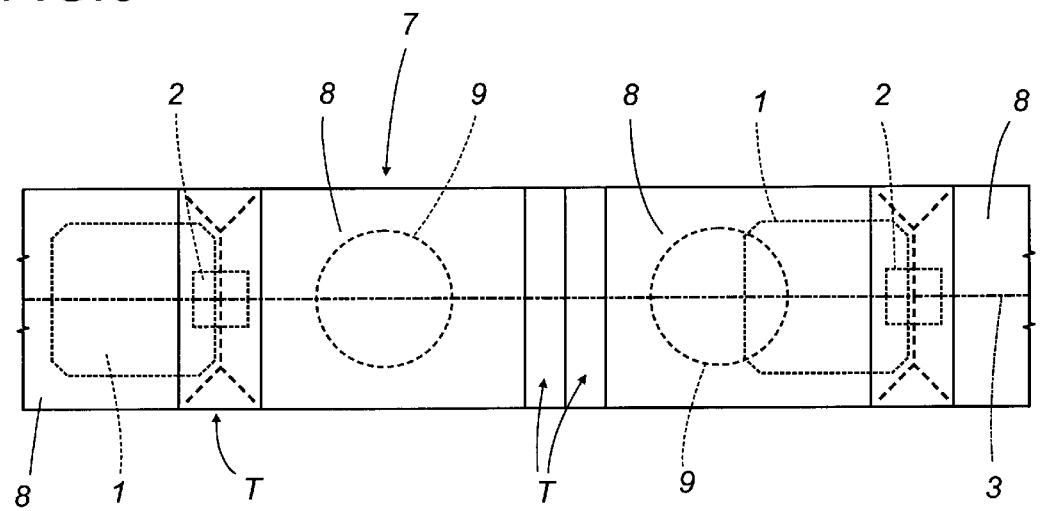
FIG. 3 is a top plan view of part of a continuous tubular envelope consisting of filter bag lobes made using the machine illustrated in FIG. 1.

The machine 5 comprises, in a horizontal direction A, a first station 50 which feeds a web 51 of filter paper to a second station 52, where the product for infusion is distributed in doses 9 on the web 51, followed by a longitudinal heat-sealing operation (not illustrated); a third station 53 for sealing the web 51 by means of a series of transversal heat-seals T, so as to form a flat tubular envelope 7 with a succession of single lobes 8, each lobe being sealed and containing a dose 9 of the product (as illustrated in FIG. 3).

Figure 4:
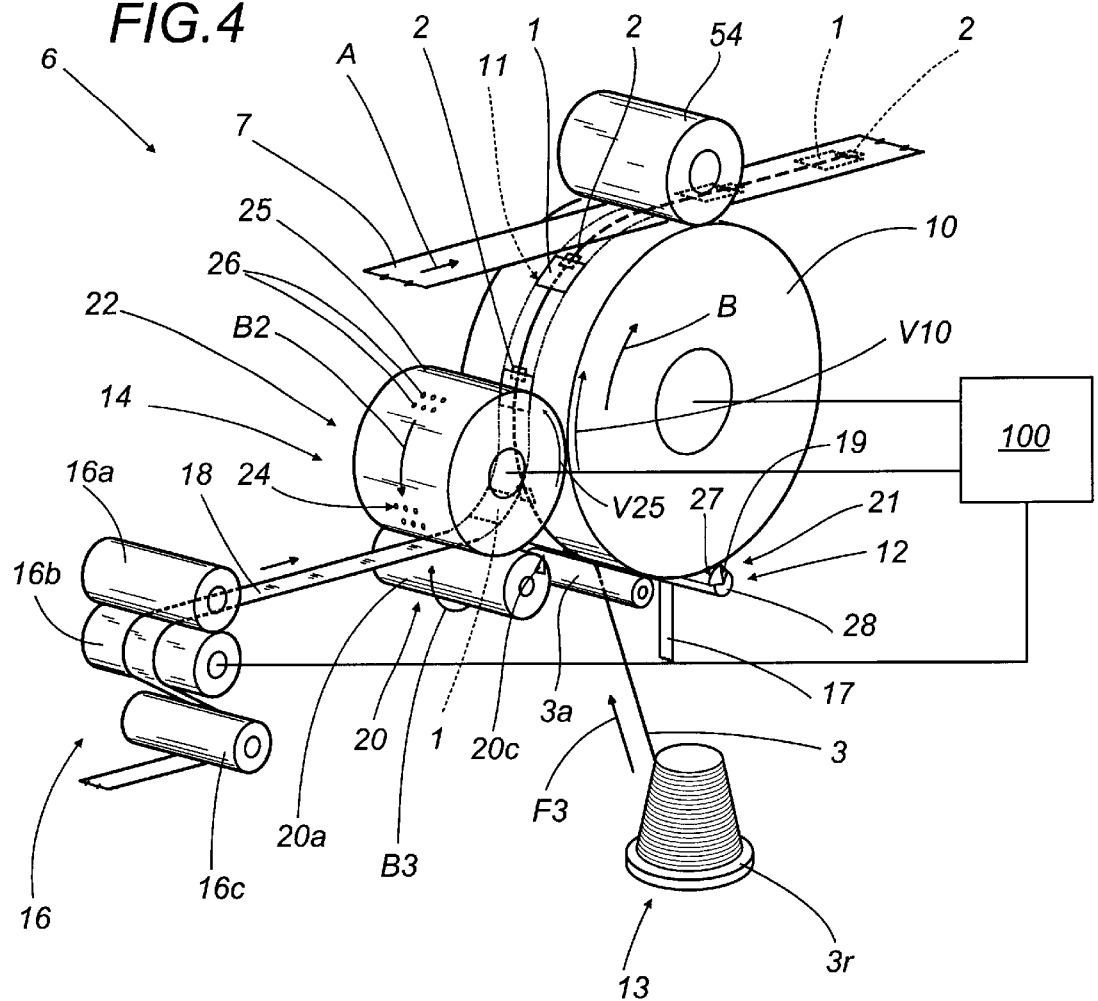
FIG. 4 is schematic perspective view, with some parts cut away to better illustrate others, of a detail C of the machine illustrated in FIG. 1.

FIGS. 3 and 4 show how the flat tubular envelope 7 is fed (by special means which are not illustrated) to a station 6, where heat-sealing is used to apply a continuous thread 3 to the lower surface of the flat tubular envelope 7. The continuous thread 3 bears a plurality of heat-sealable seals 2 and pick-up tabs 1, spaced at preset intervals, corresponding to the total length of two contiguous lobes 8 on the tubular envelope 7, so that they are attached to the transversal seals T on the lobes 8.

As illustrated in FIG. 4, the application station 6 comprises a first drum 10, rotating with continuous motion in a direction B (clockwise in FIG. 1) which is the same as direction A. The external surface of the drum has a plurality of vacuum seats 11 for the positioning and pick up of the seals 2, continuous thread 3 and pick-up tabs 1, fed from three feed units 12, 13 and 14, located one after another relative to the direction of rotation B and around the first drum 10.

Above the drum 10 and attached to it, there is a heating counter-drum 54, rotating in the opposite direction to the first drum 10 and forming a contact and heating surface during positioning of the pick-up tabs 1, seals 2 and continuous thread 3, for joining them to the continuous tubular envelope 7.

The continuous thread 3 feed unit 13, of the known type and located between the other two units 12 and 14, comprises a spool 3r and at least one guide roller 3a for the thread 3 (see FIG. 4).

As illustrated in FIGS. 1 and 4, the feeds units 12 and 14, for the seal 2 and pick-up tab 1, comprise respective units 15, 16 which feed webs 17, 18 to elements 19, 20 that cut the webs 17, 18 so as to form individual seals 2 and individual pick-up tabs 1.

In practice, each unit 12, 14 comprises feed rollers for the relative continuous web 17, 18. These rollers are labeled 15a and 15b for the web 17 of the seal 2 and 16a, 16b and 16c for the web 18 of the pickup tab 1.

Figure 5:
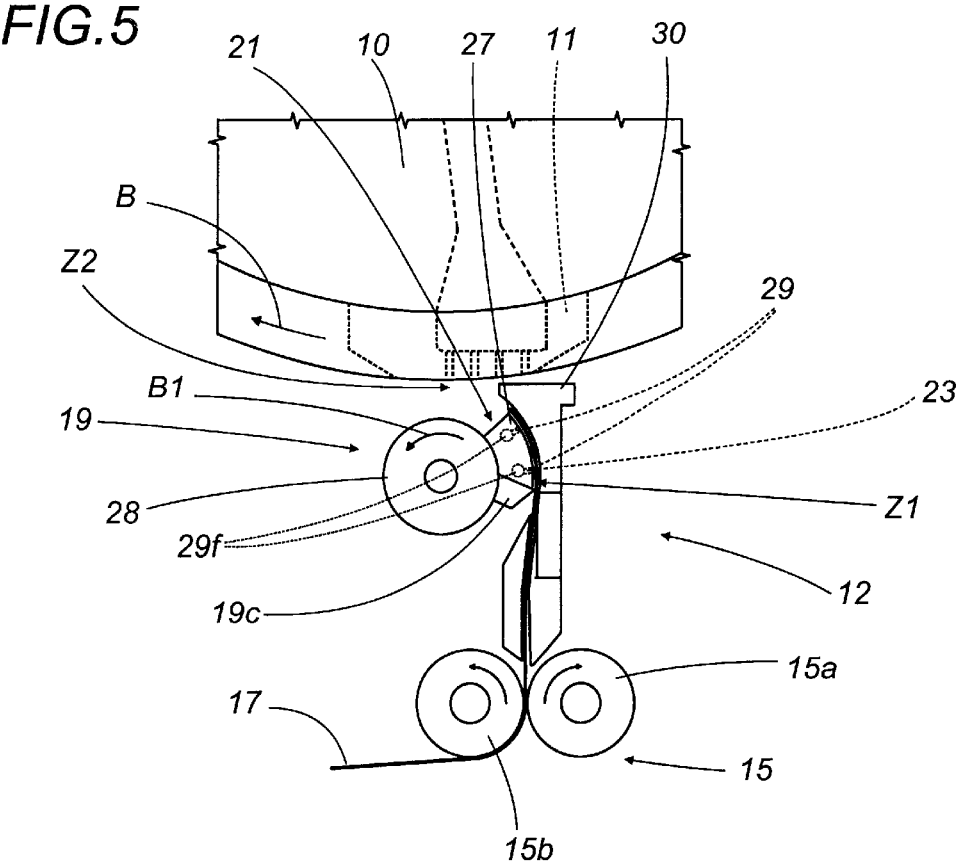
FIGS. 5 and 6 are schematic front views of a detail D of the machine illustrated in FIG. 1, in two different operating sequences, for the pick up and transfer of a seal.
Figure 6:
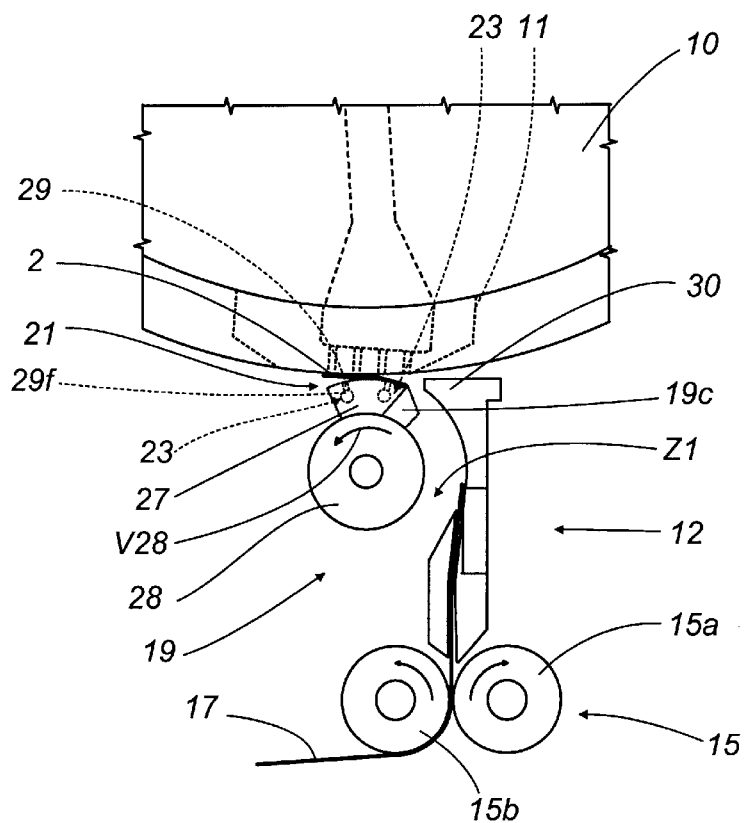

As illustrated in FIGS. 4, 5 and 6, the seal 2 feed unit 12 and the pick-up tab 1 feed unit 14 comprise transfer means 21 and 22 for the pick up and transfer of the individual seals 2 and the individual pick-up tabs 1, each of the transfer means operating between the cutting element 19, 20 and the drum 10 to pick up the seal 2 or pick-up tab 1 at a first zone Z1, Z1', and transfer the seal 2 or pick-up tab 1 to a pick-up seat 11 on the first drum 10 at a second zone Z2, Z2', which is separated from the previous zone by a given angle, releasing the seal 2 or pick-up tab 1 onto the seat 11.

Looking in more detail, the transfer means 21, 22 comprise respective pick-up parts 23, 24 designed to retain the seals 2 and pick-up tabs 1 using a vacuum.

Again as illustrated in FIGS. 4, 5 and 6, and more specifically as regards the construction details, the cutting element 19, 20 comprises a knife 19c, 20c mounted on a rotary support roller 28, 20a which rotates with continuous motion in a direction B1, B3.

More specifically, the transfer means 21 comprise an arced sector 27 fixed to and projecting from the knife 19c support roller 28 and further forward than the knife 19c, relative to the direction of rotation B1 of the roller 28, which is anti-clockwise in FIGS. 5 and 6.

The arced sector 27 has a pair of through-holes 29, forming the pick-up parts 23, communicating with a vacuum source 29f (indicated simply with a connecting hole in FIG. 6), so as to pick up the individual seal 2 (see FIG. 5) at the zone Z1, then release it in a synchronized fashion at the zone Z2, into a seat 11 on the first drum 10, following rotation of the arced sector 27 (see FIG. 6).

Moreover, the arced sector 27 and knife 19c are positioned opposite a fixed track 30, extending in an arced configuration and forming a contact base for the seal 2. The web 17 feed rollers 15 feed the web 17 in steps, each equaling the amount required for a single seal 2 on the track 30, thus allowing the pick up of a portion of the web 17 by the arced sector 27 and subsequent cutting by the knife 19c on the fixed track 30.

As illustrated in FIG. 4, the transfer means 22 comprise a second drum 25, which rotates with a continuous motion in a direction B2, anti-clockwise in FIG. 4, opposite to the direction B of rotation of the first drum 10 and the direction of rotation B3 of the relative roller 20a.

The external surface of the second drum 25 has a plurality of equidistant holes 26 which form groups, connected to a vacuum source 26f (illustrated as a shared pipe connected to all of the holes 26) and forming the pick up parts 24. In operation, a group of holes 26 is designed to pick up a single pick-up tab 1, made by the knife 20c on the surface of the drum 25, at the zone Z1'(FIG. 1), then transfer it, releasing it in a synchronized fashion, to a seat 11 in the first drum 10 at the zone Z2'.

Again with reference to FIG. 4, the numeral 100 is used to denote a block which represents a control unit connected directly to the first drum 10, the support roller 28 and the second drum 25, to control the respective speeds of rotation and keep the peripheral speeds (labeled V10, V28 and V25 in FIG. 4) constantly equal.

Therefore, in operation, on the seats 11 of the first drum 10, the individual seals 2 cut are joined to the continuous thread 3 unwound from the spool 3r (in the direction indicated by arrow F3), then the pick-up tabs 1 are attached to the seals and thread, forming a succession of sets consisting of a pick-up tab 1, a seal 2 and continuous thread 3, to be applied to the flat tube 7 fed in direction A inside the machine 5.

The packaging machine 5 thus designed, therefore, fulfils the stated aims thanks the presence of the rotary arced sector 27 of the unit 12 and the second drum 25 of the unit 14, which allow the seals 2 and pick-up tabs 1 to be transferred from the respective zones Z1, Z1'to the seats 11 of the drum 10 at the zones Z2, Z2'independently of the formation of the seals 2 and pick-up tabs 1. In this way, each seal 2 or each pick-up tab 1 is picked up by a vacuum seat 11 in a perfectly synchronized fashion and is positioned on the seat 11 correctly, avoiding any tension or "jerking" on the seals 2 or pick-up tabs 1.

Therefore, even if the speed of rotation of the drum 10 is considerably increased, partly thanks to the control unit 100 which detects the speed value and consequently adjusts the speed of rotation of the rollers 25 and 28 so that the latter constantly have the same peripheral speed as the drum 10, each seal 2 and each pick-up tab 1 can always be transferred to the seat 11 of the drum 10 in a precise and correct manner.

The invention described can be subject to numerous modifications and variations without thereby departing from the scope of the inventive concept. Moreover, all the details of the invention may be substituted by technically equivalent elements.

What is claimed:

1. A packaging machine for making filter bags for products for infusion, the filter bags being made from a flat tubular envelope of filter paper containing a succession of doses of the product for infusion; each filter bag having a connecting thread and a pick-up tab, joined to one another and to the filter bag by a seal made of a heat-sealable material; the packaging machine including at least one station which uses heat-sealing to apply the continuous thread on a lower surface of the flat tubular envelope, the continuous thread bearing the seal and pick-up tab, the application station comprising:

a first drum rotating with continuous motion in a given direction and positioned tangentially relative to the tubular envelope;

a plurality of seats on an outer surface of the first drum; and a plurality of feed units, wherein the plurality of seats retain the seals, thread and pick-up tabs, which are fed from relative feed units, wherein each feed unit is positioned downstream of the next feed unit relative to the rotation direction of the first drum, and wherein the feed units for the seals and pick-up tabs comprise respective web feed units which feed corresponding continuous webs to cutting elements that cut the webs and form individual seals and pick-up tabs, the web feed units each having transfer means operating between the cutting elements and the first drum and picking up the individual seals and pick-up tabs at a first zone at the cutting elements and transferring the individual seals and pick-up tabs to a second zone separate from the first zone by a given angle opposite a seat on the first drum, wherein each cutting element comprises a cylindrical roller which rotates with continuous motion in a defined direction and presents a cylindrical outer surface which supports a knife, and wherein the seal transfer means comprise an arced sector which is fixed to and projects outwards from the cylindrical outer surface of the knife support roller and positioned further forward than the knife; the arced sector having at least one through-hole, forming relative vacuum pick up means for the individual seal which are connected to a vacuum source, and wherein each individual seal contacts the arced sector and does not contact the cylindrical outer surface of the knife support roller.

2. The machine according to claim 1, wherein the pick-up tab transfer means comprise a second drum, rotating with continuous motion in a defined direction opposite to the direction of rotation of the first drum and the direction of rotation of the knife support roller; the external surface of the second drum having a plurality of holes connected to a vacuum source and forming vacuum pick up means.

3. The machine according to claim 1, comprising a unit for controlling the speed of the first drum, the arced sector support roller, the knife and the second drum, so as to maintain the relative peripheral speeds constantly equal.

4. A packaging machine for making filter bags for products for infusion, the filter bags being made from a flat tubular envelope of filter paper containing a succession of doses of the product for infusion; each filter bag having a connecting thread and a pick-up tab, joined to one another and to the filter bag by a seal made of a heat-sealable material; the packaging machine including at least one station which uses heat-sealing to apply the continuous thread on a lower surface of the flat tubular envelope, the continuous thread bearing the seal and pick-up tab, the application station comprising:

a first drum rotating with continuous motion in a given direction and positioned tangentially relative to the tubular envelope;

a plurality of seats on an outer surface of the first drum; and a plurality of feed units, wherein the plurality of seats retain the seals, thread and pick-up tabs, which are fed from relative feed units, wherein each feed unit is positioned downstream of the next feed unit relative to the rotation direction of the first drum, and wherein the feed units for the seals and pick-up tabs comprise respective web feed units which feed corresponding continuous webs to cutting elements that cut the webs and form individual seals and pick-up tabs, the web feed units each having transfer means operating between the cutting elements and the first drum and picking up the individual seals and pick-up tabs at a first zone at the cutting elements and transferring the individual seals and pick-up tabs to a second zone separate from the first zone by a given angle opposite a seat on the first drum, wherein each cutting element comprises a cylindrical roller which rotates with continuous motion in a defined direction and presents a cylindrical outer surface which supports a knife, and wherein the seal transfer means comprise an arced sector which is fixed to and projects outwards from the cylindrical outer surface of the knife support roller and positioned further forward than the knife; the arced sector having at least one through-hole, forming relative vacuum pick up means for the individual seal which are connected to a vacuum source, and wherein the arced sector and the knife are positioned opposite a fixed track extending in an arced configuration and forming a contact base for the seals.

* * * * *